(12) United States Patent
Chou

(10) Patent No.: US 7,089,762 B2
(45) Date of Patent: Aug. 15, 2006

(54) MULTI-STAGE VACUUM DISTILLING, COOLING AND FREEZING PROCESSES AND APPARATUSES FOR SOLUTION SEPARATION AND SEAWATER DESALINATION

(76) Inventor: Cheng-Ming Chou, 10/F-3, No.8 Lane 226, Jen-ai Rd., Lin 16, Nanshin Vill., Linkou Hsiang,Taipei (TW)

( * ) Notice: Subject to any disclaimer, the term of this patent is extended or adjusted under 35 U.S.C. 154(b) by 412 days.

(21) Appl. No.: 10/606,785

(22) Filed: Jun. 27, 2003

(65) Prior Publication Data
US 2004/0069014 A1    Apr. 15, 2004

(30) Foreign Application Priority Data
Oct. 15, 2002    (TW) ............................. 91123725 A

(51) Int. Cl.
F25J 3/00    (2006.01)
B01D 9/04    (2006.01)
B01D 3/00    (2006.01)
B01D 3/10    (2006.01)

(52) U.S. Cl. ............................. 62/617; 62/532; 203/91
(58) Field of Classification Search .............. 62/606, 62/617, 532; 203/91
See application file for complete search history.

(56) References Cited

U.S. PATENT DOCUMENTS 1,655,603 A * 1/1928 Wright ....................... 208/366
3,575,007 A * 4/1971 Gunther ...................... 62/620
3,961,658 A * 6/1976 Pagani ...................... 159/13.2
4,235,678 A * 11/1980 McKeen .................. 202/185.1
4,374,706 A * 2/1983 Molla .......................... 203/91
4,475,988 A * 10/1984 Tsumura et al. ............ 202/174
5,435,436 A * 7/1995 Manley et al. ............... 203/74
5,441,606 A * 8/1995 Schlesinger et al. .......... 203/39
5,525,200 A * 6/1996 LaNois et al. .............. 202/205
5,820,748 A * 10/1998 Shadikhan .................. 208/179

* cited by examiner

Primary Examiner—William C. Doerrler
(74) Attorney, Agent, or Firm—Rosenberg, Klein & Lee

(57) ABSTRACT

Multi-stage vacuum distilling, cooling, and freezing processes for solution separation and seawater desalination are implemented through multi-stage vacuum distilling, cooling, and freezing systems. The systems are set to their initial state for implementing constant temperature distilling process, drain-to-vacuum and freezing process, transferring of a specific solution, and recycling of a hot circulating solution, so as to separate the specific solution. In the multi-stage cooling process, vacuum evaporation cooling is utilized to cool the solution in order to supply the low-temperature solution needed in the multi-stage vacuum freezing process. Vapors produced in the multi-stage vacuum distilling and cooling systems provide condensation heat needed to melt ice crystals produced in the multi-stage vacuum freezing system. And, the low-temperature concentrated solution and molten ice crystals produced in the multi-stage vacuum freezing system may be used to cool the hot circulating solution discharged at the lowest stage of the multi-stage vacuum distilling system.

11 Claims, 3 Drawing Sheets

MULTI-STAGE VACUUM DISTILLING, COOLING AND FREEZING PROCESSES AND APPARATUSES FOR SOLUTION SEPARATION AND SEAWATER DESALINATION

FIELD OF THE INVENTION

The present invention relates to multi-stage vacuum distilling, cooling, and freezing processes for solution separation and seawater desalination, and more particularly to multi-stage vacuum distilling, cooling, and freezing processes for solution separation and seawater desalination in which a vacuum environment is provided in a vacuumized vessel obtained through a drain-to-vacuum process and a degassed solution is caused to flow through a liquid-gas interface or a liquid-solid interface to evaporate, cool, and freeze the degassed solution. The present invention also relates to apparatuses for implementing the aforesaid processes.

BACKGROUND OF THE INVENTION

Solution separating techniques have been widely employed in many fields, including general distillation, concentration of medical liquid, and desalination of seawater.

When a large quantity of solution is separated through heating, a considerably high amount of energy would be uneconomically consumed. For example, in the desalination of seawater, the solution, that is, the seawater, is directly heated to evaporate water contained in the seawater. Vapors of water are then drawn with a vacuum pump. To do so, a large amount of energy is consumed. Moreover, the salt content of seawater continuously increases in the course of separating water from the seawater. Thus, it is necessary and highly uneconomically to consume more energy to complete the separation of water from the seawater.

Further, various types of salt crystalline are produced in the process of heating seawater at high temperature to result in the problem of scaling, which in turn results in a condenser with largely reduced efficiency to produce only limited amount of water from separation of seawater and failure in fulfilling the high demand for water.

It is therefore tried by the inventor to develop processes and apparatuses for solution separation and seawater desalination through multi-stage vacuum distilling, vacuum cooling and vacuum freezing to eliminate the drawbacks existed in the conventional method for separating water from seawater.

SUMMARY OF THE INVENTION

A first object of the present invention is to achieve a desired solute concentration. To achieve this object without consuming too much energy and within a lower temperature range, a multi-stage vacuum distilling system is employed. In the system, the drain-to-vacuum process implemented using a degassed liquid to produce vacuums in evaporating vessels (because air pressure in the evaporating vessels is negligible). Since expanded ranges of temperature and pressure can be used in vacuum distillation, more stages of vacuum distillation are allowable. In the present invention, constant temperature distilling process, solution transfer, and recycling of hot circulating solution are performed to separate a solution to be separated and recover most part of heat energy for repeated use. Temperatures for vacuum distillation at multiple stages are set depending on a temperature gradient of the hot circulating solution, so that separation of a degassed solution is achieved in the form of multi-stage vacuum distillation. In this way, more solution can be separated with one unit of energy, and the low-temperature concentrated solution discharged in the solution separation can be subjected to vacuum freezing and drying for further solute concentration.

Another object of the present invention is to reduce costs for seawater desalination. Since the temperature and pressure ranges used in the present invention are expanded to facilitate increase of stages of vacuum distillation, the yield of pure water is increased. Meanwhile, since the evaporation heat for water is about seven times as high as the condensation heat for water, the employment of freezing would consume less energy than heating to produce the same amount of pure water. The present invention employs multi-stage vacuum freezing to produce low-temperature concentrated seawater and molten ice crystals to effectively reduce the temperature of hot circulating solution discharged at the last or lowest stage of multi-stage vacuum distillation. This in turn enables increased stages of vacuum distillation and yield of pure water. Finally, the low-temperature hot circulating solution recovers evaporation heat from the stages of vacuum distillation from bottom to top, so that most part of heat energy can be repeatedly utilized. The low-temperature solution, that is, the seawater, required in the multi-stage vacuum freezing is supplied from the last or the lowest stage of a multi-stage vacuum cooling process, and the ice crystals produced in the multi-stage vacuum freezing is molten with vapors produced in the multi-stage distilling and cooling processes. That is, the present invention combines multi-stage vacuum distilling, multi-stage vacuum cooling, and multi-stage vacuum freezing processes to effectively reduce costs for seawater desalination.

A further object of the present invention is to reduce the land cost for constructing a seawater desalination plant. In the multi-stage vacuum distilling, cooling, and freezing processes according to the present invention, the drain-to-vacuum process is implemented to produce vacuums in conduits, evaporating vessels, condensers, and freezing vessels included in the apparatuses and having a degassed solution, vapors, or condensate flown there through. The drain-to-vacuum process is based on the Torricellian vacuum principle that the pressure of atmosphere supports the column of liquid in the tube. In the apparatuses of the present invention, the first, second, third, and all subsequent stages of evaporating vessels or freezing vessels are stacked over one another from top to bottom like a tower to increase a height difference between these vessels and their common lower vessel and parts thereof. This stacked tower-like structure enables reduction of land area required to construct a seawater separation plant, also reduces energy required to produce vacuums. The tower-like multi-stage vacuum distilling, cooling, and freezing apparatuses enable the hot circulating solution, the solution to be separated (i.e. the seawater), and the condensate to continuously flow, which in turn minimizes the use of pumps and the occurrence of scales and corrosion in the apparatuses.

To achieve the above and other objects, the multi-stage vacuum distilling, cooling, and freezing processes for solution separation and seawater desalination according to the present invention are implemented with a multi-stage vacuum distilling system, a multi-stage vacuum cooling system, and a multi-stage vacuum freezing system. After the multi-stage vacuum distilling system is set to an initial state thereof, constant temperature distilling process, solution transfer, and recycling of hot circulating solution are performed to separate a specific solution. Temperatures for vacuum distillation at multiple stages are set according to a temperature gradient of the hot circulating solution, so that separation of a degassed solution is achieved in the form of multi-stage vacuum distillation. When the hot circulating solution is discharged from the last or the lowest stage, its temperature must be reduced. The hot circulating solution then flows from bottom to top to pass through condensers included in different stages one by one and recovers evaporation heat. Therefore, the hot circulating solution is gradually heated when it flows upward, and most part of heat energy is recovered for using repeatedly. To increase the number of stages of multi-stage vacuum distillation, and to increase the amount of solution separable with one unit of energy, the range of usable temperature of the hot circulating solution is expanded. In other words, the lower the temperature of the hot circulating solution discharged from the last stage of vacuum distillation is, the more stages can be included in the multi-stage vacuum distillation. For a multi-stage vacuum distilling system having more stages of distillation, the solution to be separated must have further lowered temperature to reduce the temperature of the hot circulating solution discharged from the last stage and thereby maintains a balanced thermal cycling between evaporation and condensation. For this purpose, multi-stage vacuum cooling and multi-stage vacuum freezing may be utilized to assist in the multi-stage vacuum distillation. To do this, the multi-stage vacuum cooling and freezing systems are set to their initial state, and constant temperature distilling process, solution transfer, and a drain-to-vacuum and freezing process are implemented to achieve solution separation through freezing. In the multi-stage vacuum cooling process, a vacuum evaporation cooling effect is utilized to reduce the temperature of solution being separated, so that the latter could be used as the low-temperature solution in the multi-stage vacuum freezing process to save the cost of pre-cooling. In the multi-stage vacuum freezing process, condensation heat required to melt ice crystals comes from the vapors produced in multi-stage vacuum distilling and cooling processes. The low-temperature concentrated solution and molten ice crystals produced in the multi-stage vacuum freezing process may be used to lower the temperature of the hot circulating solution discharged at the last stage of multi-stage vacuum distillation. Therefore, the present invention combines the multi-stage vacuum distilling, cooling and freezing processes to achieve solution separation, seawater desalination, and solute concentration.

In implementing the drain-to-vacuum process to produce vacuums in conduits, evaporating vessels, freezing vessels, and condensers included in the apparatuses of the present invention and having the degassed solution, the vapors or the condensate flown therethrough, the air pressure in these areas is negligible. In the constant temperature distilling process that employs the principle that boiling point of liquid increases with increased pressure, it is possible to use the temperature gradient of the hot circulating solution in different stages, so that the constant temperature distilling process is achieved in the form of multi-stage vacuum distillation having distillation temperature and saturated vapor pressure that decrease from upper to lower stages, and increased heat transfer area and more condensate. In the constant temperature distilling process, the hot circulating solution having a set temperature flows from upper to lower stages to continuously and sequentially pass through liquid-gas interfaces in the evaporating vessels at different stages one by one and thereby provides evaporation heat to evaporate the degassed solution. When the hot circulating solution is discharged at the last or the lowest stage, its temperature must be reduced. The hot circulating solution then flows from bottom to top to continuously pass through condensers included in different stages one by one and recovers evaporation heat for vapors to condense to liquid. This causes the temperature of the hot circulating solution to gradually increase when the hot circulating solution flows upward to the higher stages, and most part of heat energy may be used repeatedly. The hot circulating solution finally flows back to a hot circulating solution heater and is heated to a set temperature to complete one cycle of the multi-stage vacuum distillation. Due to a saturated vapor pressure difference caused by a temperature difference between the evaporating vessel and the condenser at each stage, vapors produced by the evaporating vessel keep flowing toward the condenser. So long as the condenser has a temperature lower than that of the evaporating vessel, the condenser would continuously condense the vapors to liquid. The condensate and vapors together flow into the condenser at the next lower stage, which has lower temperature and saturated vapor pressure, for further reduction of temperature and condensation. The condensate is finally collected in a vacuum vessel that is always kept in a predetermined low temperature. In this way, the balanced thermal cycling between evaporation and condensation can be maintained. The degassed solution flows from top to bottom to continuously pass through the evaporating vessels at different stages one by one, and a concentrated solution discharged at the last or the lowest stage can be subjected to vacuum freezing and drying for further solute concentration.

The multi-stage vacuum cooling process employs the principle of vacuum evaporation cooling to reduce the temperature of solution, so that the produced cooled solution may be used as a low-temperature solution in the multi-stage freezing process. By implementing the constant temperature distilling process, the degassed solution of room temperature flows from top to bottom to continuously pass through the evaporating vessels at all stages one by one, and therefore gradually cools when it flows downward through the multiple stages. As a result, vapors produced in the multi-stage vacuum cooling process maybe used to melt ice crystals produced in the multi-stage vacuum freezing process.

The low-temperature solution required in the multi-stage vacuum freezing comes from the multi-stage vacuum cooling process. The implementation of solution transfer and drain-to-vacuum and freezing process and the release of heat from the condensers cause production of ice crystals in the freezing vessels. The low-temperature concentrated solution and molten ice crystals discharged in the multi-stage vacuum freezing process may be used to lower the temperature of the hot circulating solution discharged at the last or the lowest stage of vacuum distillation, and to stabilize the temperature of the vacuum vessel for recovering the condensate, so that the balanced thermal cycling between the evaporation and the condensation can be maintained. Meanwhile, vapors produced in the multi-stage vacuum distilling and cooling systems may be guided into the freezing vessels in the multi-stage vacuum freezing system to melt the ice crystals. The produced low-temperature concentrated solution and molten ice crystals are then collected with vacuum vessels.

The following are advantages of using the multi-stage vacuum freezing, distilling, and cooling processes together to upgrade the thermal efficiency and increase the yield of condensate:

1. The low-temperature concentrated solution and molten ice crystals produced in the multi-stage vacuum freezing system may be used to reduce the temperature of the hot circulating solution discharged at the last stage of the multi-stage vacuum distilling system, and to maintain the temperature of the vacuum vessels for collecting the condensate; and the range of usable temperature for the hot circulating solution is expanded to enable increased stages for the multi-stage vacuum distillation and increased yield of condensate.
2. The low-temperature degassed solution required in the multi-stage vacuum freezing system comes from the solution discharged at the last stage of the multi-stage vacuum cooling system to enable minimized cost for pre-cooling.
3. The condensation heat required in the multi-stage vacuum freezing system to melt the ice crystals comes from the vapors produced in the multi-stage vacuum distilling and cooling system.
4. With the combined multi-stage vacuum distilling, cooling, and freezing processes and systems, it is possible to use a common lower vessel and parts thereof for producing vacuums.

Therefore, in the present invention, multi-stage vacuum distilling, cooling, and freezing processes are used together to achieve the solution separation, seawater desalination, and solute concentration.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
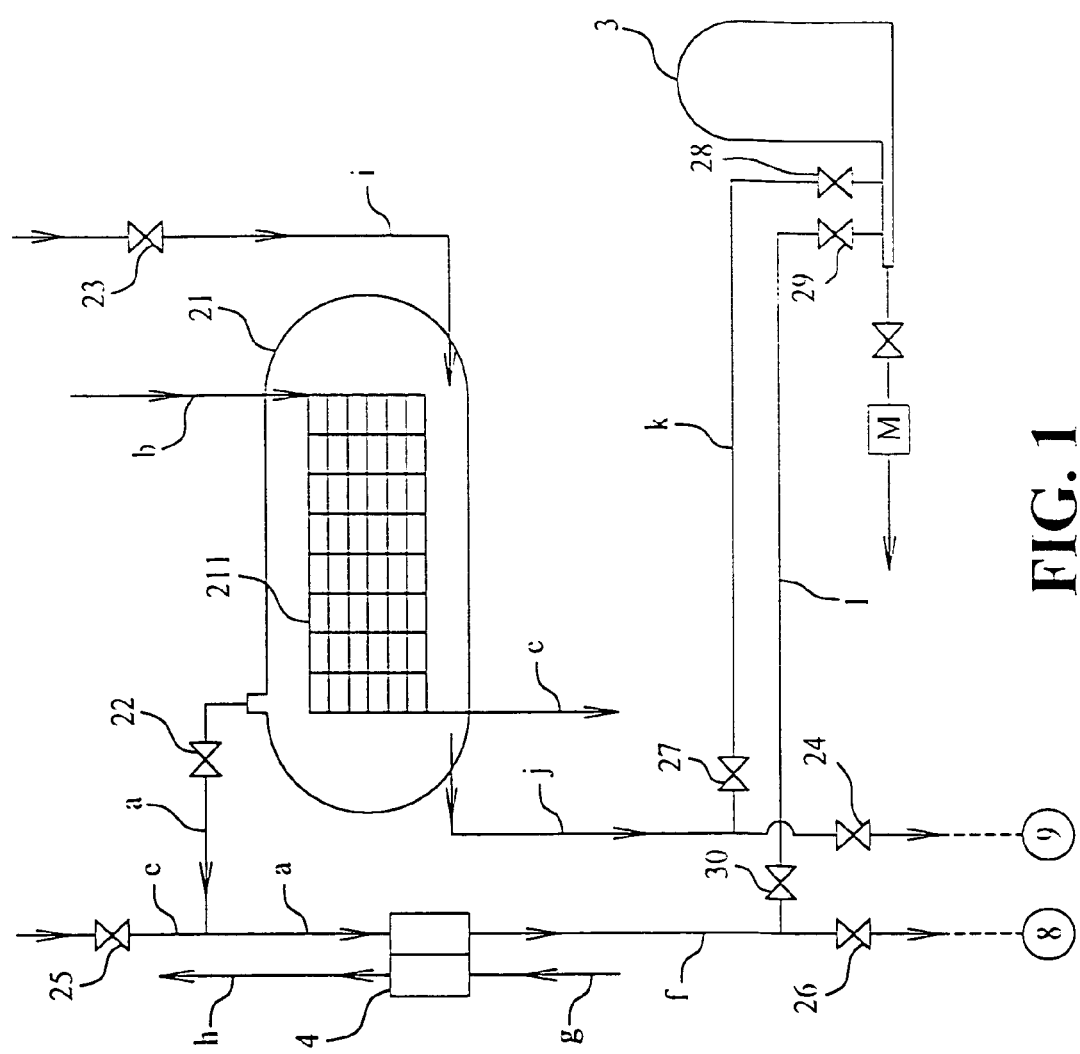
FIG. 1 is a schematic view of a constant temperature distillation unit for vacuum distillation for implementing a constant temperature distilling process according to the present invention.

Please refer to FIG. 1 that is a schematic view of a constant temperature distillation unit for vacuum distillation 2 for implementing a constant temperature distilling process according to the present invention. The constant temperature distilling process is developed based on the principles that the boiling point of a liquid increases with the increased pressure, and that the temperature difference between two vacuum environments results in the difference in saturated vapor pressure therebetween. In this process, the constant temperature distillation unit for vacuum distillation 2 is used to cause a degassed solution in a vacuumized evaporating vessel to constantly boil and evaporate at a set temperature without changing a saturated vapor pressure of the evaporating vessel, so that a balanced thermal cycling between evaporation and condensation can be maintained.

As shown in FIG. 1, the constant temperature distillation unit for vacuum distillation 2 mainly includes an evaporating vessel 21, a flow regulating valve 22, a condenser 4, a liquid-gas interface 211, a condensing tube a, a plurality of conduits b, c, e, f, g, h, i, j, k, and l, and a plurality of control valves 23, 24, 25, 26, 27, 28, 29, and 30.

The evaporating vessel 21 is connected to the condenser 4 via the condensing tube a, so that vapors produced in the evaporating vessel 21 are guided into the condenser 4.

The flow regulating valve 22 is located at a predetermined point on the condensing tube a. When the evaporating vessel 21 is under the saturated vapor pressure at the set temperature for vacuum distillation, the flow regulating valve 22 is adapted to control the vapors produced by the evaporating vessel 21 for them to enter the condenser 4 via the condensing tube a, so as to maintain the saturated vapor pressure of the evaporating vessel 21.

Hot circulating solution, which recovers evaporation heat, is caused to flow into and out of the condenser 4 via conduits g and h, respectively, at a predetermined flow rate to absorb the evaporation heat of vapors produced by the evaporating vessel 21 and therefore be heated. The vapors entered into the condenser 4 are therefore condensed to produce condensate that is finally discharged to a vacuum vessel 8 and be collected.

Meanwhile, degassed solution having a set temperature is caused to flow into the evaporating vessel 21 via conduits i and j, respectively, and control valves 23, 24 thereof at a predetermined flow rate.

The liquid-gas interface 211 is located in the evaporating vessel 21. Hot circulating solution, which provides evaporation heat, is caused to flow into and out of the liquid-gas interface 211 via conduits b and c, respectively, at a predetermined flow rate. The liquid-gas interface 211 provides heat transfer to evaporate the degassed solution inside the evaporating vessel 21. Since the evaporation-heat-providing hot circulating solution has a temperature higher than that of the evaporation-heat-recovering hot circulating solution, the evaporating vessel 21 has a working temperature higher than that of the condenser 4. The temperature difference between the evaporating vessel 21 and the condenser 4 results in a difference in the saturated vapor pressure between them, driving the vapors produced by the evaporating vessel 21 to flow toward the condenser 4 and thereby maintain a balanced thermal circulation between evaporation and condensing.

The conduit i and the control valve 23 thereof are connected to another constant temperature distillation unit for vacuum distillation located at an upper stage, or to a heater for heating the degassed solution. The conduit j and the control valve 24 thereof are connected to another constant temperature distillation unit for vacuum distillation located at a lower stage, or to a vacuum vessel 9. The conduit j and the control valve 24 thereof have the same functions as that of the conduit i and the control valve 23 thereof but to guide the degassed solution into the constant temperature distillation unit for vacuum distillation located at the lower stage.

The conduit e and the control valve 25 thereof are connected to a constant temperature distillation unit for vacuum distillation located at an upper stage. In the event there is not a constant temperature distillation unit for vacuum distillation located at an upper stage, the conduit e and the control valve 25 thereof are used to discharge gas in implementing the drain-to-vacuum process.

The conduit f and the control valve 26 thereof are connected to a constant temperature distillation unit for vacuum distillation located at a lower stage or to the vacuum vessel 8. The conduit f and the control valve 26 thereof have the same functions as that of the conduit e and the control valve 25 thereof but to guide the vapors and condensate into the constant temperature distillation unit for vacuum distillation located at the lower stage.

The conduits b and h are connected to a constant temperature distillation unit for vacuum distillation at an upper stage or to a heater for heating the hot circulating solution. The conduits c and g are connected to a constant temperature distillation unit for vacuum distillation at a lower stage or to a heat exchanger.

The control valves 27 and 30 are provided to prevent the degassed solution from flowing back into the evaporating vessel 21 and the condenser 4 when a vacuum is produced in a constant temperature distillation unit for vacuum distillation located at an adjacent higher or lower stage. Therefore, the control valves 27 and 30 are closed to seal the evaporating vessel 21 after the evaporating vessel 21 is vacuumized through the drain-to-vacuum process.

As shown in FIG. 1, the constant temperature distillation unit for vacuum distillation is set to an initial state thereof by implementing the drain-to-vacuum process using a degassed liquid (please refer to U.S. patent application Ser. No. 10/206,099). In the initial state, vacuums are produced in the conduits a, e, f, i and j, the evaporating vessel 21, and the condenser 4 through which the degassed solution, vapors, or condensate flow. A lower vessel 3 and parts thereof are connected to the conduits j and f via the conduits k and l and their respective control valves 27, 28 and 29, 30. With a suitable height difference between the between the lower vessel 3 and the constant temperature distillation unit for vacuum distillation 2, the drain-to-vacuum process is implemented to produce vacuums in the above-mentioned members. When the control valves 24, 26 are closed, the evaporating vessel 21, the condenser 4, and the conduits a, e, f, i, j, k, and l are filled with the degassed liquid. Then, the control valves 23, 25 are closed, the internal pressure of the lower vessel 3 is adjusted, and the drain-to-vacuum process is started. Finally, the flow regulating valve 22 and the control valves 27, 30 are closed, and the vacuumized evaporating vessel 21 is filled with the degassed solution to a predetermined level and set to the temperature for vacuum distillation. It is to be noted the temperature for vacuum distillation set for the evaporating vessel 21 is lower than the temperatures of the degassed solution and the hot circulating solution flown into the evaporating vessel 21 and the liquid-gas interface 211, respectively. In the event the degassed liquid and the degassed solution are the same type of liquid, the evaporating vessel 21 may be partially vacuumized during the drain-to-vacuum process.

When the constant temperature distilling process is implemented with a suitable liquid-gas interface 211, the amount of producible vapors depends on the flows of the degassed solution and the hot circulating solution, and a difference between a flow-in and a flow-out temperature of each of the two types of solutions. As can be seen from FIG. 1, when the degassed solution and the hot circulating solution continuously flow into and out of the evaporating vessel 21 and the liquid-gas interface 211, respectively, the evaporating vessel 21 would continuously produce vapors. When a saturated vapor pressure at the temperature set for vacuum distillation is reached in the evaporating vessel 21, the flow regulating valve 22 is opened for the vapors produced by the evaporating vessel 21 to flow into the condenser 4. When the condenser 4 continuously condenses the vapors flown there into to liquid, it is necessary to maintain the evaporating vessel 21 at a stable saturated vapor pressure through the flow regulating valve 22, and the latter is adjusted depending on the flow-out temperature of the degassed solution or the hot circulating solution. When the flow-out temperature of the degassed solution or the hot circulating solution is lower than the temperature for vacuum distillation, the flow regulating valve 22 is adjusted to decrease the flow rate of vapors discharged from the evaporating vessel 21; and when the flow-out temperature of the degassed solution or the hot circulating solution is higher than the temperature for vacuum distillation, the flow regulating valve 22 is adjusted to increase the flow rate of vapors discharged from the evaporating vessel 21.

When the liquid-gas interface 211 and the conduits b, c via which the hot circulating solution providing evaporation heat flows into and out of the liquid-gas interface 211 are omitted, the constant temperature distillation unit for vacuum distillation 2 is turned into a constant temperature distillation unit for vacuum cooling. In this case, the degassed solution uses its own temperature as a heat source. When the degassed solution evaporates, its temperature is lowered to provide a vacuum evaporation cooling effect. The constant temperature distillation unit for vacuum cooling may be set to an initial state the same as that of the constant temperature distillation unit for vacuum distillation.

In the course of vacuum distillation or vacuum cooling, air remained in the degassed solution would continuously accumulate in the conduits a, e, f, i and j, the evaporating vessel 21, and the condenser 4, through which the degassed solution, the vapors, or the condensate flow. In the event the accumulated air produces a pressure that is sufficient to affect the temperature for vacuum distilling the degassed solution, it is necessary to set the constant temperature distillation unit for vacuum distillation or vacuum cooling to the initial state again using the degassed solution, so that the unit resumes its original degree of vacuum. Thus, a highly degassed solution is useful in decreasing the times of implementing necessary procedures for setting the constant temperature distillation unit to the initial state.

Figure 2:
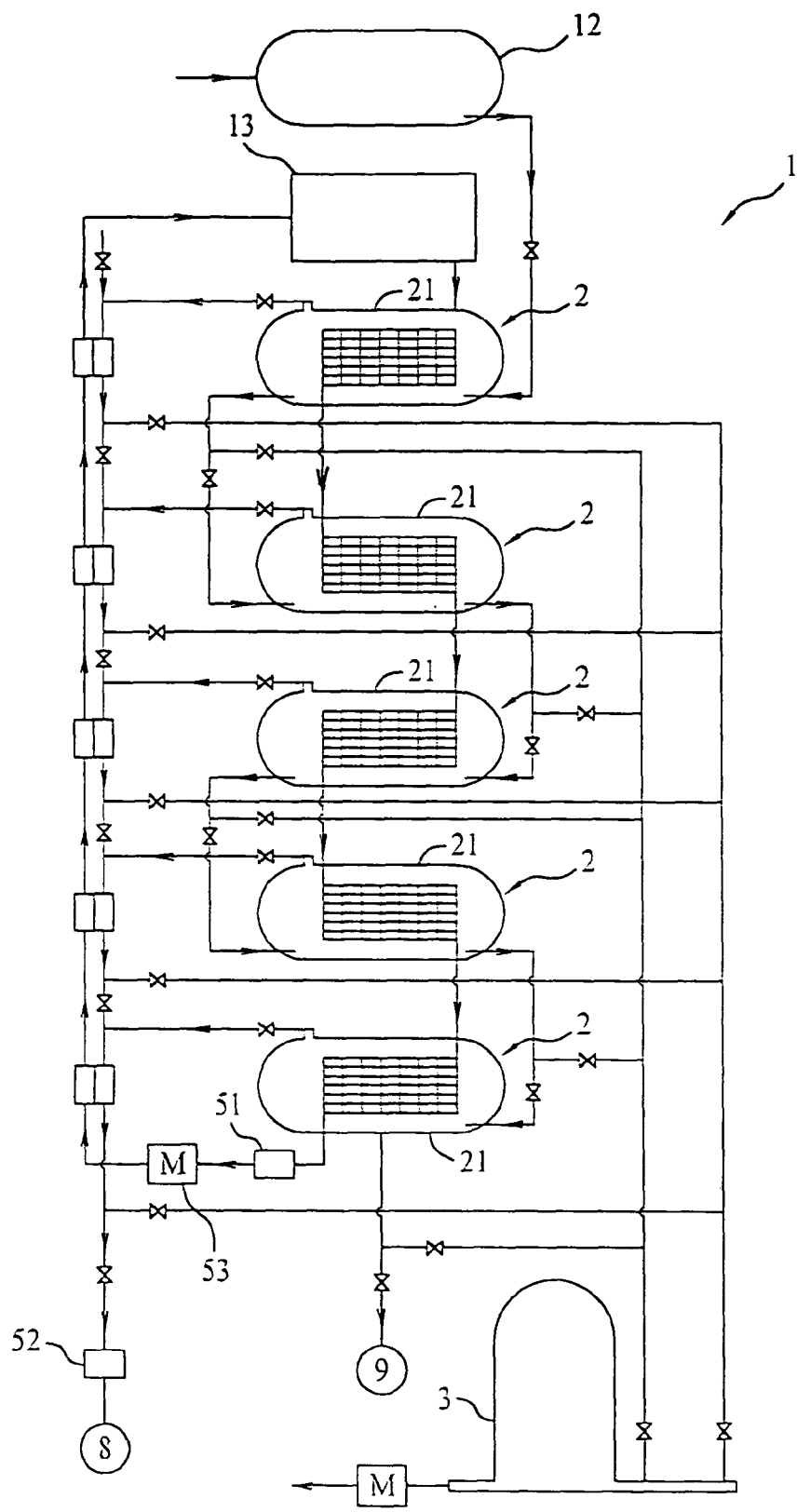
FIG. 2 is a schematic view of a multi-stage vacuum distilling system for implementing a multi-stage vacuum distilling process according to the present invention.

Please refer to FIG. 2 that is a schematic view of a multi-stage vacuum distilling system for implementing a multi-stage vacuum distilling process according to the present invention. As shown, the multi-stage vacuum distilling system 1 of the present invention mainly includes fore-treatment equipment, a plurality of constant temperature distillation units for vacuum distillation 2, and post-treatment equipment.

The fore-treatment equipment includes a degassed solution heater 12 for heating a purified and degassed solution to a set temperature, and a hot circulating solution heater 13 for heating a hot circulating solution to a set temperature.

The constant temperature distillation units for vacuum distillation 2 are sequentially stacked one by one into a tower-like multi-stage structure. The first stage, or the highest stage, is stacked over the second stage; the second stage is stacked over the third stage; and the last stage is the lowest stage. The in-flow conduit b of each constant temperature distillation unit 2 is connected at a distal end to the out-flow conduit c of a preceding unit 2, that is, a unit 2 at a higher stage. All the constant temperature distillation units 2 in the same one multi-stage vacuum distilling system use a common lower vessel 3 and parts thereof to produce vacuums.

The post-treatment equipment includes vacuum vessels 8 and 9 for collecting condensate and concentrated solution, respectively, a first heat exchanger 51 for lowering the temperature of the hot circulating solution discharged at the last stage, a second heat exchanger 52 for keeping the vacuum vessel 8 for collecting the condensate at a set temperature, a common lower vessel 3 and parts thereof for all the constant temperature distillation units for vacuum distillation 2, and a circulation pump 53 for the hot circulating solution.

As can be seen from FIG. 2, the multi-stage vacuum distilling system 1 is set to an initial state by setting all the constant temperature distillation units for vacuum distillation 2 one by one from lower to upper stages to an initial state; setting a temperature gradient of the hot circulating solution according to a liquid-gas equilibrium curve of the degassed solution; and then setting the temperature for vacuum distillation at each stage according to the temperature gradient of the hot circulating solution. Since the temperature for vacuum distillation decreases from upper to lower stages, the saturated vapor pressure at the vacuum distilling temperature at different stage decreases from upper to lower stages.

As shown, in the solution transfer in the multi-stage vacuum distillation of the present invention, the degassed solution heated to a set temperature is caused to continuously flow into the evaporating vessel 21 at each stage from upper to lower stages at a constant flow rate. When the degassed solution evaporates at each stage, a concentration thereof gradually increases from upper to lower stages, or crystalline precipitate is formed therein. The concentrated solution discharged at the last stage is collected in the vacuum vessel 9. The collected concentrated solution may be subjected to further solute concentration using vacuum freezing and drying process. In the event there is crystalline precipitate in the evaporating vessel 21, the crystalline is first filtered off before the degassed solution flows into the evaporating vessel 21 at the next lower stage. The crystalline is collected in a vacuum vessel. Again, air dissolved and thereby remained in the degassed solution would continuously accumulate in the constant temperature distillation units for vacuum distillation 2. When an amount of the accumulated air is sufficient to affect the vacuum distilling temperature of the degassed solution, the constant temperature distillation units for vacuum distillation 2, particularly those at the first and the second stage, should be set to the initial state again using the degassed solution, so that the constant temperature distillation units resume to the required degree of vacuum. Thus, a highly degassed solution is useful in minimizing the times of setting the constant temperature distillation units 2 to the initial state.

In recycling the hot circulating solution in the multi-stage vacuum distilling process of the present invention, the hot circulating solution heated to a set temperature is caused to continuously flow into and out of the liquid-gas interface 211 at each stage from upper to lower stages at a predetermined flow rate to provide the degassed solution with required evaporation heat, causing the temperature of the hot circulating solution to decrease from upper to lower stages. The heat exchanger 51 lowers the temperature of the hot circulating solution discharged at the last stage, and the circulation pump 53 works for the hot circulating solution to continuously flow into and out of the condenser 4 at each stage from lower to upper stages to absorb evaporation heat and thereby condenses vapors to condensate, causing the temperature of the hot circulating solution to increase from lower to upper stages. The hot circulating solution finally flows back to the heater 13. In order to recycle most part of heat energy for repeated use, the hot circulating solution is cycled in the following manner: (A) being heated to a set temperature; (B) being used to provide evaporation heat, so that the temperature thereof decreases from upper to lower stages; (C) being cooled to a lower temperature; and (D) being used to recover evaporation heat, so that the temperature thereof increases from lower to upper stages. In the event the hot circulating solution discharged at the last stage has a temperature lower than the room temperature, the multi-stage vacuum distilling process may be associated with multi-stage vacuum cooling and freezing processes, so that the temperature of the hot circulating solution may be lowered with low-temperature concentrated solution and molten ice crystals produced in the multi-stage vacuum cooling and freezing processes. Or, in the event the hot circulating solution discharged at the last stage has a temperature higher than the room temperature, a liquid of room temperature is used to lower the temperature of the hot circulating solution.

The temperature gradient of the hot circulating solution providing the evaporation heat is set according to the liquid-gas equilibrium curve of the degassed solution, and the vacuum distilling temperature at each stage is set according to the temperature gradient of the hot circulating solution providing the evaporation heat. Since temperature ranges for different stages do not overlap with one another, the temperature curve formed by the hot circulating solution flowing through each vacuum distilling stage is a trapezoidal curve showing the temperature gradient of the hot circulating solution.

Figure 3:
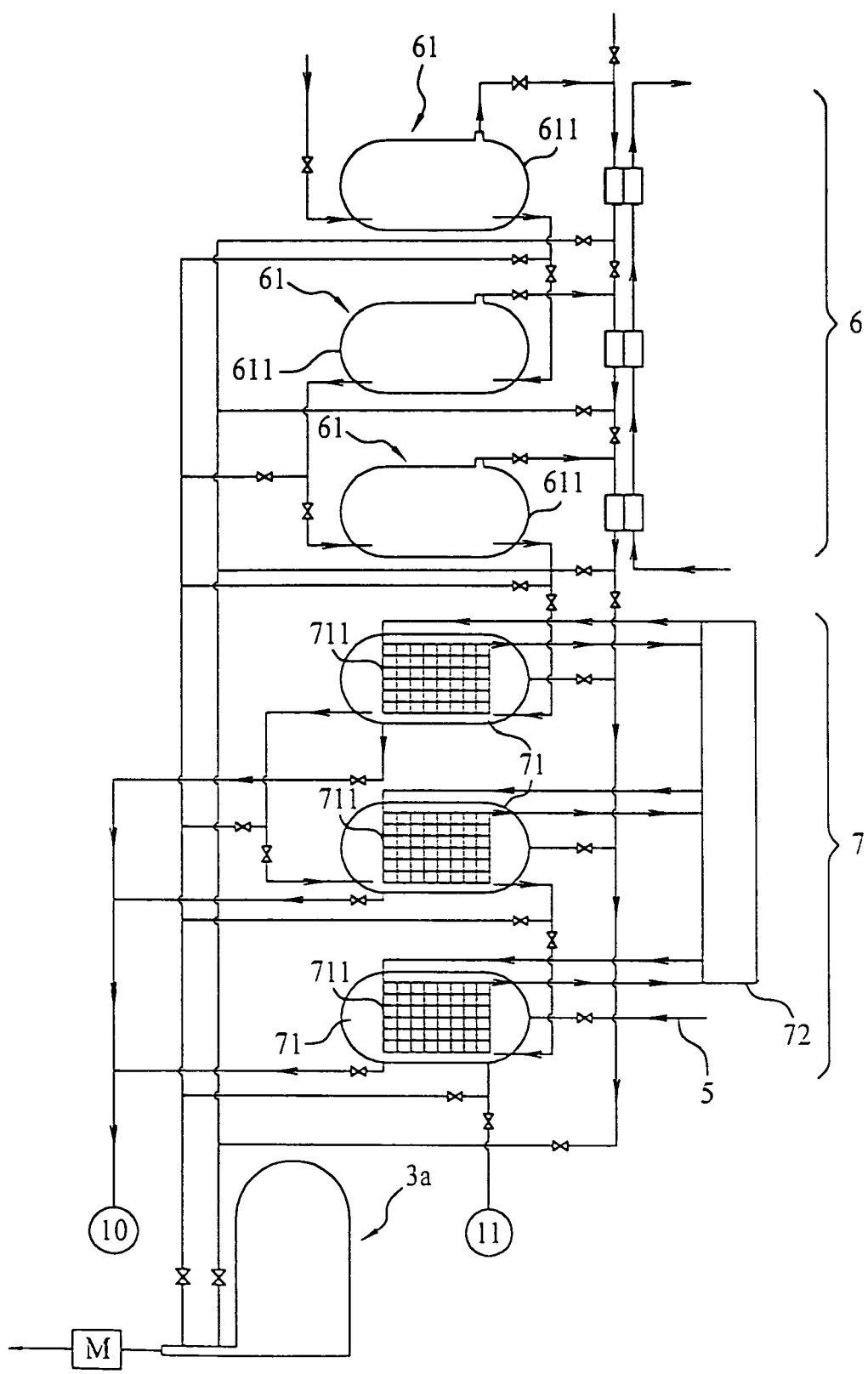
FIG. 3 is a schematic view of a multi-stage vacuum cooling system and a multi-stage vacuum freezing system for implementing multi-stage vacuum cooling and freezing processes according to the present invention.

Please refer to FIG. 3 that is a schematic view of a multi-stage vacuum cooling system 6 and a multi-stage vacuum freezing system 7 combined together for implementing multi-stage vacuum cooling and freezing processes according to the present invention.

The multi-stage vacuum cooling and freezing processes for solution separation produce condensate through freezing and melting. The processes also function as subsidiary processes to the multi-stage vacuum distillation, so that the range of usable temperature of the hot circulating solution is expanded and the stages of vacuum distillation can be increased to upgrade the yield of condensate and the thermal efficiency of the whole system. Low-temperature solution discharged at the last stage of the multi-stage vacuum cooling system may be guided to the first stage of the multi-stage vacuum freezing system to save the energy that is otherwise needed for pre-cooling. Through performing the solution transfer, the constant temperature distilling process, and a drain-to-vacuum and freezing process, the degassed solution is caused to produce ice crystals. The concentration of the degassed solution increases during the vacuum freezing process from upper to lower stages while its temperature decreases from upper to lower stages.

As shown in FIG. 3, the multi-stage vacuum cooling system 6 includes a plurality of constant temperature distillation units for vacuum cooling 61 sequentially stacked one by one to form a tower-like multi-stage structure. The in-flow conduits of each constant temperature distillation unit for vacuum cooling 61 is connected at a distal end to corresponding out-flow conduits of a preceding unit 61, that is, a unit 61 at a higher stage. The degassed solution uses its own temperature to proceed with vacuum evaporation and vacuum cooling. A room temperature degassed solution is caused to continuously flow into and out of evaporating vessels 611 at different stages from top to bottom at a predetermined flow rate. By implementing the constant temperature distilling process, the temperature of the degassed solution decreases from upper to lower stages while its concentration does not significantly change. The degassed solution discharged at the last stage of the multi-stage cooling system has a temperature close to the freezing temperature thereof. A common lower vessel 3a and parts thereof are provided for the plurality of constant temperature distillation units for vacuum cooling 61.

The multi-stage vacuum freezing system 7 includes a plurality of freezing vessels 71 sequentially stacked one by one to form a tower-like multi-stage structure. Each freezing vessel 71 has a liquid-solid interface 711 provided therein for heat transfer. Through the heat transfer by the liquid-solid interface 711, a condenser 72 causes the degassed solution to release condensation heat. A conduit 5 connects the multi-stage vacuum freezing system 7 to the multi-stage vacuum distillation system, allowing vapors produced through multi-stage vacuum distillation and multi-stage vacuum cooling to separately flow into the freezing vessel 71 at each stage. When the freezing vessels 71 produce ice crystals therein, they have a temperature lower than that of the evaporating vessels 611 in the multi-stage vacuum cooling system 6. This allows the vapors produced by the evaporating vessels 611 to successfully flow into the freezing vessels 71 and melt the ice crystals therein. The multi-stage vacuum freezing system 7 and the multi-stage vacuum cooling system 6 use the same one lower vessel 3a and parts thereof to vacuumize conduits, freezing vessels 71, and evaporation vessels through which the degassed solution, the vapors, or the condensate flow. Molten ice crystals and low-temperature concentrated solution produced in the drain-to-vacuum and freezing process are collected in vacuum vessels 10 and 11, respectively, and may be used to lower the temperature of the hot circulating solution discharged at the last stage of the multi-stage vacuum distilling system, and to keep the temperature of the collected condensate.

To set the multi-stage vacuum freezing system 7 to an initial state, the drain-to-vacuum process is implemented using a degassed liquid for all stages one by one from lower to upper stages to vacuumize conduits and freezing vessels 71 through which the degassed solution, the vapors, or the condensate flow. And, the degassed liquid is prevented from flow backward.

On the other hand, to set the multi-stage vacuum cooling system 6 to an initial state, the constant temperature distillation units for vacuum cooling 61 at all stages are set to an initial state one by one from lower to upper stages. Thereafter, the temperature for distillation through vacuum cooling is set for each stage. Since the distillation temperature decreases from upper to lower stages, the saturated vapor pressure under vacuum cooling decreases from upper to lower stages, too.

In the drain-to-vacuum and freezing process, heat releasing via the condenser 72 and falling-film freezing through drain-to-vacuum process are utilized for the degassed solution to form evenly composed ice crystals on the liquid-solid interfaces 711. As can be seen in FIG. 3, the vacuumized freezing vessel 71 at the first stage is completely filled with the low-temperature degassed solution discharged from the last stage of the multi-stage vacuum cooling system 6. Each of the freezing vessels 71 is internally provided with a liquid-solid interface 711 for forming ice crystals. With heat transfer at the condenser 72 and the liquid-solid interfaces 711, condensation heat and evaporation heat in the freezing vessels 71 are released. Meanwhile, the drain-to-vacuum process is implemented to discharge the degassed solution for the same to sequentially flow into the second stage, the third stage, etc. The degassed solution discharged at the last stage flows into the vacuum vessel 11 and is collected therein. A liquid level of the degassed solution in each freezing vessel 71 gradually lowers with the discharge of the degassed solution therefrom, resulting in the gradual increase of a vacuum volume in the freezing vessel 71. Meanwhile, the releasing of heat via the condenser 72 and the falling-film freezing process causes the liquid-phase degassed solution to form evenly composed ice crystals on the liquid-solid interfaces 711 while the vacuum volume in the freezing vessels 71 gradually increases. As a result of continuous release of heat via the condenser 72, a pressure in the vacuum volume becomes lower than a saturated vapor pressure, and the degassed solution begins to evaporate at its liquid surface. In the course of surface evaporation of the degassed solution, heat is absorbed to cause cooling of the remaining mother liquid of the degassed solution. That is, the temperature of the degassed solution decreases due to an effect of evaporation cooling. Vapors produced in the vacuumized freezing vessels 71 are adsorbed at the surfaces of the liquid-solid interfaces 711. The condenser 72 moves heat from the vapors, causing them to turn into solid-phase ice crystals. This in turn causes the degassed solution to evaporate continuously to maintain an equilibrium vapor pressure and to produce more ice crystals. The remained mother liquid gradually concentrates and is slowly discharged, and the vacuum volume in the vacuumized freezing vessels 71 gradually increases. The increased vacuum volume in turn causes production of more vapors to accelerate the production of ice crystals. The condensation of the discharged mother liquid becomes higher and higher. At last, there are only ice crystals in the freezing vessels 71.

As shown in FIG. 3, the solution is transferred from upper to lower stages to flow through every freezing vessel 71. Only when the freezing vessel 71 at a higher stage has completely discharged all the non-frozen degassed solution to the freezing vessel 71 at the next lower stage, the drain-to-vacuum and freezing process is implemented at the next lower stage. Meanwhile, vapors produced by the multi-stage vacuum distilling system and the multi-stage vacuum cooling system are guided into the freezing vessels 71 at this point to melt the ice crystals. Finally, the produced condensate is collected in the vacuum vessel 10. Therefore, in the multi-stage vacuum freezing process, the forming and the melting of ice crystals do not occur in succession. In the event there is crystalline precipitate in the freezing vessel 71, the crystalline is first filtered off before the degassed solution flows into the freezing vessel 71 at the next lower stage. The crystalline is collected in a vacuum vessel. Again, air dissolved and thereby remained in the degassed solution would continuously accumulate in the constant temperature distillation units for vacuum cooling. When an amount of the accumulated air is sufficient to affect the vacuum distilling temperature of the degassed solution, the constant temperature distillation units for vacuum cooling 61, particularly those at the first and the second stage, should be set to the initial state again using the degassed solution, so that the constant temperature distillation units 61 resume to the required degree of vacuum. Thus, a highly degassed solution is useful in decreasing the times of setting the constant temperature distillation units for vacuum cooling 61 to the initial state.

In comparison with other conventional processes and apparatuses for similar purpose, the multi-stage vacuum distilling, cooling, and freezing processes and systems for solution separation and seawater desalination according to the present invention have the following advantages:

1. In the processes and systems of the present invention, it is possible to use low-temperature waste heat or solar energy as heat source for the heaters included in the systems.

2. In the present invention, the drain-to-vacuum process using a degassed liquid is implemented for the evaporating vessels to produce vacuums and has an ignorable internal air pressure. This enables an increased number of stages for the multi-stage vacuum distilling process and system.

3. Based on the principle of using the drain-to-vacuum process to produce vacuums, the evaporating vessels are sequentially stacked one by one to form the tower-like structure of the multi-stage vacuum distilling and cooling systems to minimize the land area needed to construct the systems.

4. With the evaporating vessels stacked into the tower-like structure, the degassed solution, the hot circulating solution, and the condensate of the distilled water are always in a flowing state, and the working temperature of the evaporating vessels decreases from upper to lower stages to reduce the use of pumps and thereby reduce the forming of incrustation scales and rust in the evaporating vessels.

5. The hot circulating solution not only provides the evaporation heat needed by the degassed solution, but also recovers the evaporation heat, so that most part of heat energy can be repeatedly used.

6. The multi-stage vacuum cooling system provides the vacuum freezing system with the required low-temperature degassed solution to save the cost for pre-cooling in the vacuum freezing process.

7. The low-temperature concentrated solution and the molten ice crystals discharged by the drain-to-vacuum and freezing apparatus may be used to lower the temperature of the hot circulating solution discharged at the last stage of the multi-stage vacuum distillation, enabling the multi-stage vacuum distilling system to include more stages.

The present invention has been described with a preferred embodiment thereof and it is understood that many changes and modifications in the described embodiment can be carried out without departing from the scope and the spirit of the invention as defined by the appended claims.

What is claimed is:

1. A constant temperature distilling process, comprising the steps of implementing a drain-to-vacuum process using a degassed liquid to set a constant temperature distillation unit for vacuum distillation, or a constant temperature distillation unit for vacuum cooling to an initial state thereof; and setting a vacuum distilling temperature for said constant temperature distillation unit for a degassed solution therein to boil and evaporate at said set vacuum distilling temperature in said unit; such that an equilibrium thermal cycling between evaporation and condensation can be maintained throughout said constant temperature distillation unit, and evaporation heat and condensate produced in said constant temperature distilling process are recovered and collected, respectively; said constant temperature distillation unit for vacuum distillation including an evaporating vessel, and a liquid-gas interface provided in said evaporating vessel, into and out of which a hot circulating solution flows via corresponding conduits and control valves at a predetermined flow rate, and said hot circulating solution providing evaporation heat through a heat transfer at said liquid-gas interface to evaporate said degassed solution in said evaporating vessel; vacuumizing said conduits, said evaporating vessel, and said condenser through which said degassed solution, said vapors, or said condensed liquid flows, through implementing said drain-to-vacuum process using said degassed liquid to set said constant temperature distillation unit for vacuum distillation to an initial state; sealing said conduits, said evaporating vessel, and said condenser; closing said flow regulating valve; filling said vacuumized evaporating vessel with said degassed solution to a predetermined liquid level; and finally, setting the vacuum distilling temperature for said evaporating vessel; wherein said vacuum distilling temperature being lower than temperatures of said degassed solution and said hot circulating solution flown into said evaporating vessel and said liquid-gas interface, respectively.

2. The constant temperature distilling process as claimed in claim 1, wherein said constant temperature distillation unit for vacuum cooling includes an evaporating vessel, into which constant-temperature degassed solution flows via corresponding conduits and control valves at a predetermined flow rate, said evaporating vessel being connected to a condenser via a condensing tube for vapors produced by said evaporating vessel to flow into said condenser; a flow regulating valve provided on said condensing tube at a predetermined position for controlling the flow rate of vapors discharged from said evaporating vessel when said evaporating vessel is under a saturated vapor pressure at said set vacuum distilling temperature, and thereby maintaining said evaporating vessel at said desired saturated vapor pressure; a condenser, into and out of which hot circulating solution flows via corresponding conduits and control valves at a predetermined flow rate to absorb evaporation heat of vapors produced by said evaporating vessel and flown into said condenser, so that said hot circulating solution is heated to a higher temperature and said vapors are condensed into liquid, which is then discharged into and collected with a vacuum vessel; and a lower vessel and parts thereof being located below said evaporating vessel with a predetermined height difference existed between them for producing vacuums in said conduits, said evaporating vessel, and said condenser through which said degassed solution, said vapors, or said condensed liquid flows.

3. The constant temperature distilling process as claimed in claim 1, further comprising the steps of causing said degassed solution and said hot circulating solution to continuously flow into and out of said evaporating vessel and said liquid-gas interface, respectively, for said evaporating vessel to continuously produce vapors; opening said flow regulating valve when said evaporating vessel reaches said saturated vapor pressure at said vacuum distilling temperature, in order to allow said vapors produced by said evaporating vessel to flow into said condenser and thereby maintaining said evaporating vessel at a stable saturated vapor pressure; and regulating said flow regulating valve to decrease a flow rate of said vapors being discharged when said degassed solution or said hot circulating solution providing evaporation heat has a flow-out temperature lower than said vacuum distilling temperature, or regulating said flow regulating valve to increase a flow rate of said vapors being discharged when said degassed solution or said hot circulating solution providing evaporation heat has a flow-out temperature higher than said vacuum distilling temperature.

4. The constant temperature distilling process as claimed in claim 3, wherein said equilibrium thermal cycling between evaporation and condensation is obtained by keeping said hot circulating solution providing evaporation heat at a temperature higher than that of said hot circulating solution recovering evaporation heat, so that said evaporating vessel has a working temperature higher than that of said condenser.

5. The constant temperature distilling process as claimed in claim 1, wherein said drain-to-vacuum process is implemented only to partially vacuumize said evaporating vessel when said degassed liquid used in said drain-to-vacuum process is the same as said degassed solution.

6. The constant temperature distilling process as claimed in claim 3, further comprising the step of implementing said drain-to-vacuum process using said degassed solution for a second time to set said constant temperature distillation unit for vacuum distillation or vacuum cooling to the initial state and thereby resume said unit to a desired degree of vacuum when air remained in said degassed solution continuously accumulates in said conduits, said evaporating vessel, and said condenser, through which said degassed solution, said vapors, or said condensed liquid flows, to produce a pressure high enough to affect said vacuum distilling temperature set for said degassed solution.

7. A multi-stage vacuum distilling process for solution separation, comprising the steps of providing a tower-like multi-stage vacuum distilling system; setting said multi-stage vacuum distilling system to an initial state thereof; performing a constant temperature distilling process, transferring of solutions, and recycling of a hot circulating solution to separate said solution and recover most part of heat energy for use repeatedly; and setting a vacuum distilling temperature for each stage of said multi-stage vacuum distilling system according to a temperature gradient of said hot circulating solution, so that said solution separation is achieved in the form of multi-stage vacuum distillation; wherein both said vacuum distilling temperature and a saturated vapor pressure corresponding thereto decrease from upper to lower stages in said multi-stage vacuum distilling system, allowing expanded ranges of usable vacuum distilling temperature and pressure as well as an increased number of vacuum distilling stages and more of said solution separable with one unit of energy;

said multi-stage vacuum distilling system including fore-treatment equipment including heaters separately for heating a degassed solution and said hot circulating solution to a set temperature; a plurality of constant temperature distillation units for vacuum distillation sequentially stacked one over another into a tower-like structure, in which a first stage, or the highest stage, is stacked over a next highest stage, and in-flow conduits of one said constant temperature distillation unit at a lower stage are connected at a distal end to corresponding out-flow conduits of one said constant temperature distillation unit at an upper stage; and post-treatment equipment including vacuum vessels separately for collecting condensate and concentrated solution, a first heat exchanger for lowering a temperature of said hot circulating solution discharged at the last stage, a second heat exchanger for keeping said vacuum vessel for collecting said condensate at a set temperature, a common lower vessel and parts thereof for producing a vacuum in said constant temperature distillation units for vacuum distillation, and a circulation pump for said hot circulating solution.

8. The multi-stage vacuum distilling process for solution separation as claimed in claim 7, wherein said step of setting said multi-stage vacuum distilling system to an initial state thereof is performed by sequentially setting said constant temperature distillation units for vacuum distillation to their initial state one by one from lower to upper stages; and wherein in said step of setting a vacuum distilling temperature for each stage of said multi-stage vacuum distilling system according to a temperature gradient of said hot circulating solution, said temperatures set for said multiple stages of said vacuum distilling system decrease from upper to lower stages, so that a saturated vapor pressure at the temperature set for each vacuum distillation stage decreases from upper to lower stages.

9. The multi-stage vacuum distilling process for solution separation as claimed in claim 7, wherein said step of transferring solutions further includes the steps of causing said degassed solution heated to a set temperature to continuously flow into said evaporating vessel at each stage from upper to lower stages at a predetermined flow rate; allowing said degassed solution to evaporate at each stage, so that said degassed solution has a concentration gradually increases from upper to lower stages or forms crystalline precipitate therein; collecting said concentrated solution discharged at the last stage with said vacuum vessel; subjecting said collected concentrated solution to further solute concentration using vacuum freezing and drying; filtering off any crystalline precipitate before said degassed solution flows into said evaporating vessel at the next lower stage, if there is crystalline precipitate in said evaporating vessel; and collecting said crystalline with a vacuum vessel.

10. The multi-stage vacuum distilling process for solution separation as claimed in claim 7, wherein said step of recycling a hot circulating solution further includes the steps of causing said hot circulating solution heated to a set temperature to continuously flow into and out of a liquid-gas interface at each stage from upper to lower stages at a constant flow rate to provide said degassed solution with required evaporation heat, so that the temperature of said hot circulating solution decreases from upper to lower stages; using said first heat exchanger to lower the temperature of said hot circulating solution discharged at the last stage; and using said circulation pump to cause said hot circulating solution to continuously flow into and out of a condenser at each stage from lower to upper stages to absorb evaporation heat and thereby condense produced vapors to condensate, so that the temperature of said hot circulating solution increases from lower to upper stages; and allowing said hot circulating solution to flow back to said heater for heating said circulating solution.

11. The multi-stage vacuum distilling process for solution separation as claimed in claim 7, wherein said temperature gradient of said hot circulating solution is set according to a liquid-gas equilibrium curve of said degassed solution and then used to set the vacuum distilling temperature at each stage of vacuum distillation, enabling the forming of non-overlapped temperature ranges for different stages, and a trapezoidal temperature curve showing said temperature gradient of said hot circulating solution flowing through each vacuum distilling stage.

* * * * *